(12) United States Patent
Beck (10) Patent No.: US 9,584,696 B2
(45) Date of Patent: Feb. 28, 2017

(54) IMAGING SYSTEMS WITH EMBEDDED DATA TRANSMISSION CAPABILITIES

(71) Applicant: SEMICONDUCTOR COMPONENTS INDUSTRIES, LLC, Phoenix, AZ (US)

(72) Inventor: Jeffery Beck, Corvallis, OR (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 13 days.

(21) Appl. No.: 14/667,228

(22) Filed: Mar. 24, 2015

(65) Prior Publication Data

US 2016/0286075 A1    Sep. 29, 2016

(51) Int. Cl.
*H04N 1/32* (2006.01)
*H04L 9/08* (2006.01)
(Continued)

(52) U.S. Cl.
CPC ....... *H04N 1/32277* (2013.01); *G06T 1/0007* (2013.01); *H04L 9/0822* (2013.01);
(Continued)

(58) Field of Classification Search
CPC ..... H04L 9/0819; H04L 9/083; H04L 9/0877; H04N 1/21; H04N 1/2137; H04N 1/32101;
(Continued)

(56) References Cited

U.S. PATENT DOCUMENTS 4,704,605 A * 11/1987 Edelson ............. G09G 5/20
345/589
4,857,901 A * 8/1989 Lathrop ............. G09G 5/30
345/601

(Continued)

OTHER PUBLICATIONS

Celik et al. "Lossless Generalized-LSB Data Embedding" [Online], Feb. 2005 [Retrieved: Jun. 25, 2016], www.IEEE.org, Retrieved from: < http://ieeexplore.ieee.org/stamp/stamp.jsp?tp= &arnumber=1381493 >.*

(Continued)

*Primary Examiner* — Eric W Shepperd
(74) *Attorney, Agent, or Firm* — Treyz Law Group, P.C.; Vineet Dixit (57) ABSTRACT

An imaging system may output embedded data in an output frame. Selected bits of pixel data words, corresponding to data read out from imaging pixels and non-imaging pixels, may be modified to correspond to bits of embedded data. Modifying pixel data words may include receiving a pixel data word and decatenating the pixel data words into fragments of the data word. A first fragment may correspond to bits of the data word that are replaced by embedded data bits output from an embedded data engine. A second fragment may be modified using arithmetic circuitry based on whether the embedded data bits that replace the first fragment are the same as bits of the first fragment. An output data word may be produced that includes embedded data bits at its least significant bits, most significant bits, or intermediate bits.

18 Claims, 6 Drawing Sheets

(51) Int. Cl.
*H04N 1/21* (2006.01)
*H04N 1/64* (2006.01)
*G06T 1/00* (2006.01)

(52) U.S. Cl.
CPC ....... *H04N 1/2137* (2013.01); *H04N 1/32208* (2013.01); *H04N 1/32272* (2013.01); *H04N 1/648* (2013.01)

(58) Field of Classification Search
CPC ............. H04N 1/32144–1/32149; H04N 1/32203–1/32213; H04N 1/32224; H04N 1/32229; H04N 1/32261; H04N 1/32272; H04N 1/32277
See application file for complete search history.

(56) References Cited

U.S. PATENT DOCUMENTS

| | | | | |
|---|---|---|---|---|
| 5,473,443 A * | 12/1995 | Wilkinson | ............ | H04N 5/945 386/241 |
| 5,546,513 A * | 8/1996 | Orlicki | ................. | H04N 1/502 358/1.1 |
| 5,625,374 A * | 4/1997 | Turkowski | ............ | G06T 3/4023 345/592 |
| 5,953,016 A * | 9/1999 | Rice | ........................ | G06T 15/04 345/648 |
| 6,961,441 B1 * | 11/2005 | Hershey | ................. | G06T 1/0028 382/100 |
| 7,222,235 B1 | 5/2007 | Mitsui | | |
| 7,240,208 B1 * | 7/2007 | Oakley | ................. | H04L 9/0897 348/207.99 |
| 7,269,273 B2 * | 9/2007 | Murakami | ......... | H04N 1/32203 348/E5.077 |
| 7,317,738 B2 * | 1/2008 | Kawamae | ............ | G06T 1/0071 370/529 |
| 7,616,777 B2 | 11/2009 | Rodriguez et al. | | |
| 7,724,916 B2 * | 5/2010 | Shi | ..................... | H04N 1/32203 235/470 |
| 8,280,098 B2 | 10/2012 | Yadid-Pecht et al. | | |
| 8,385,588 B2 | 2/2013 | Jacoby et al. | | |
| 2001/0030761 A1 * | 10/2001 | Ideyama | ............... | G06T 1/0028 358/1.9 |
| 2002/0071593 A1 * | 6/2002 | Muratani | ............. | G06T 1/0064 382/100 |
| 2003/0149879 A1 * | 8/2003 | Tian | ..................... | G06T 1/0028 713/176 |
| 2006/0031025 A1 * | 2/2006 | Staton | ................. | G01N 21/6452 702/20 |
| 2006/0126890 A1 * | 6/2006 | Shi | ........................ | G06T 1/0028 382/100 |
| 2007/0003104 A1 * | 1/2007 | Moroo | ................... | G06T 1/0028 382/100 |
| 2008/0031529 A1 * | 2/2008 | Sakai | ...................... | G06T 1/005 382/232 |
| 2008/0056529 A1 * | 3/2008 | Bhattacharjya | ......... | G06T 1/005 382/100 |
| 2008/0205698 A1 * | 8/2008 | Kunieda | ................ | G06T 1/0071 382/100 |
| 2009/0136080 A1 * | 5/2009 | Zandifar | ............... | G06T 1/0028 382/100 |
| 2009/0231455 A1 * | 9/2009 | Emery | ................ | H04N 1/32203 348/222.1 |
| 2010/0039524 A1 | 2/2010 | Kinrot et al. | | |
| 2010/0135379 A1 * | 6/2010 | Fortin | .................. | H04N 19/597 375/240.01 |
| 2012/0102284 A1 * | 4/2012 | Odaira | .................. | G06F 9/4435 711/163 |
| 2012/0321273 A1 * | 12/2012 | Messmer | ............. | G11B 27/031 386/224 |
| 2016/0140146 A1 * | 5/2016 | Wexler | ............. | G06F 17/30253 707/741 |

OTHER PUBLICATIONS

Wu et al. "Image steganographic scheme based on pixel-value differencing and LSB replacement methods" [Online], Oct. 2005 [Retrieved on: Jun. 25, 2016], IEEE, www.ieee.org [Retrieved from: < http://ieeexplore.ieee.org/stamp/stamp.jsp?tp=&arnumber=1515999 >.*

* cited by examiner

| EMBEDDED DATA BIT | LSB OF INPUT PIXEL DATA | OUTPUT PIXEL DATA |
|---|---|---|
| 0 | 0 | NO CHANGE (INPUT PIXEL DATA) |
| 0 | 1 | RANDOMLY INCREMENT / DECREMENT INPUT PIXEL DATA |
| 1 | 0 | RANDOMLY INCREMENT / DECREMENT INPUT PIXEL DATA |
| 1 | 1 | NO CHANGE (INPUT PIXEL DATA) |
| 0 | 0 | RANDOMLY INCREMENT / DECREMENT INPUT PIXEL DATA |
| 0 | 1 | NO CHANGE (INPUT PIXEL DATA) |
| 1 | 0 | NO CHANGE (INPUT PIXEL DATA) |
| 1 | 1 | RANDOMLY INCREMENT / DECREMENT INPUT PIXEL DATA |

IMAGING SYSTEMS WITH EMBEDDED DATA TRANSMISSION CAPABILITIES

BACKGROUND

This relates generally to imaging systems, and more particularly to imaging systems that include non-imaging data in output image frames.

Electronic devices such as cellular telephones, cameras, and computers often include imaging systems that include digital image sensors for capturing images. Image sensors may be formed having a two-dimensional array of image pixels that convert incident photons (light) into electrical signals. Electronic devices often include displays for displaying captured image data.

An imaging system often includes sources of non-imaging data that may be useful or valuable to a user of an imaging system. Non-imaging data, or more specifically, data that is not read out from image pixels may also be provided to a host processor in an imaging system, for use in image processing or calibration of the imaging system. Non-imaging data is often referred to as embedded data. Conventional imaging systems append embedded data in rows above and/or below image pixel data in an output frame. When an imaging system has a fixed or finite bandwidth for an output frame, using additional data rows to store embedded data may necessitate unwanted reduction in the amount of image pixel data that can be stored in an output frame. As an example, if an imaging system has a bandwidth of 100 rows for an output frame, and embedded data rows account for 10 rows of data above and below imaging data, only 80 rows of image pixel data is captured and stored.

As camera systems are being used to provide imaging data for use in sensitive applications such as autonomous vehicle control, it is important to maximize the amount of image pixel data that is captured in an output frame, while retaining the ability to store embedded data with the image pixel data in the output frame.

It would therefore be desirable to be able to provide imaging systems with improved embedded data transmission capabilities.

DETAILED DESCRIPTION

Figure 1:
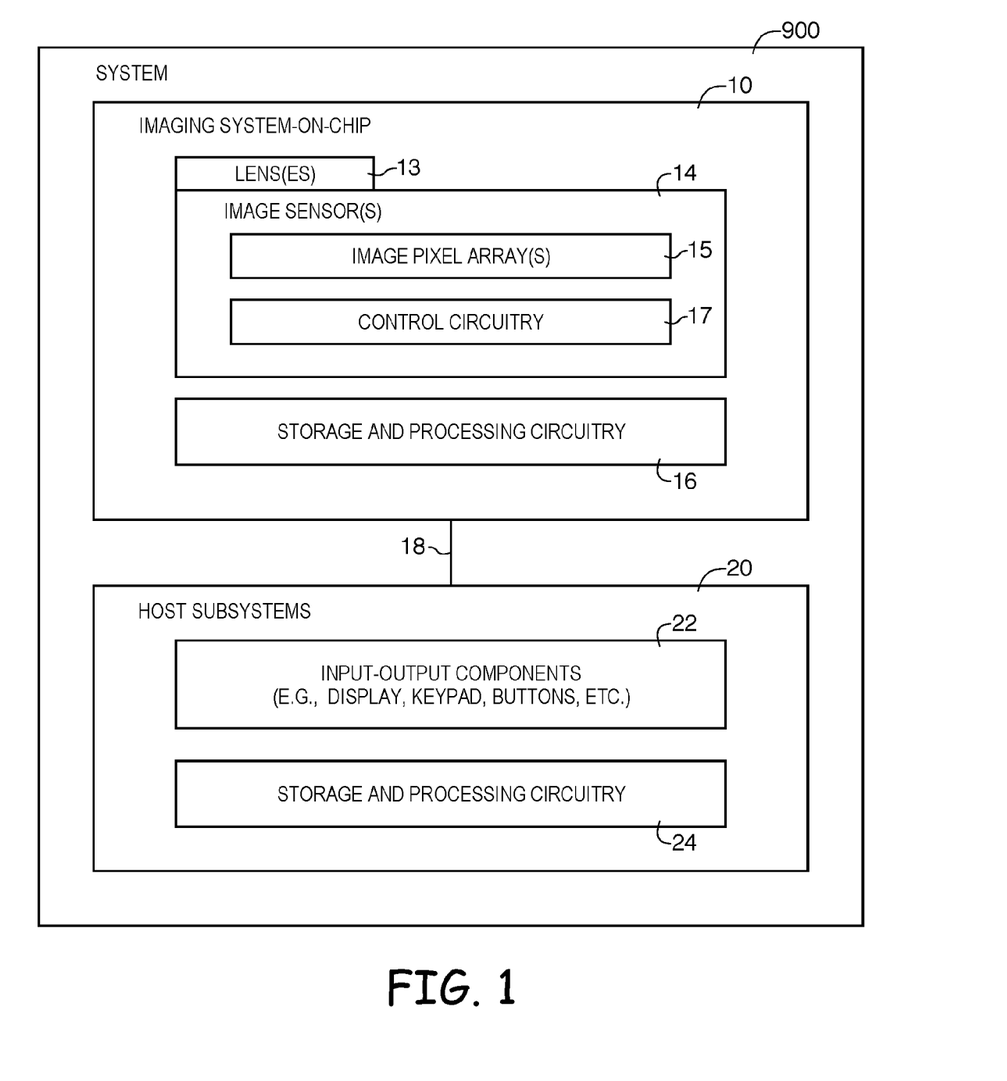
FIG. 1 is a diagram of an illustrative system that includes an imaging system and a host subsystem in accordance with an embodiment.

FIG. 1 is a diagram of an illustrative system including an imaging system for capturing images. System 900 of FIG. 1 may be a vehicle safety system (e.g., a rear-view camera or other vehicle safety system), a surveillance system, an electronic device such as a camera, a cellular telephone, a video camera, or any other desired electronic device that captures digital image data.

As shown in FIG. 1, system 900 may include an imaging system such as imaging system 10 and host subsystems such as host subsystem 20. Imaging system 10 may be an imaging system-on-chip that is implemented on a single silicon image sensor integrated circuit die. Imaging system 10 may include one or more image sensors 14 and one or more associated lenses 13. Lenses 13 in imaging system 10 may, as examples, include a single wide angle lens or M*N individual lenses arranged in an M×N array. Individual image sensors 14 may be arranged as a corresponding single image sensor or a corresponding M×N image sensor array (as examples). The values of M and N may each be equal to or greater than one, may each be equal to or greater than two, may exceed 10, or may have any other suitable values.

Each image sensor in imaging system 10 may be identical or there may be different types of image sensors in a given image sensor array integrated circuit. As one example, each image sensor may be a Video Graphics Array (VGA) sensor with a resolution of 480×640 image sensor pixels (as an example). Other arrangements of image sensor pixels may also be used for the image sensors if desired. For example, images sensors with greater than VGA resolution (e.g., high-definition image sensors), less than VGA resolution and/or image sensor arrays in which the image sensors are not all identical may be used.

During image capture operations, each lens 13 may focus light onto an associated image sensor 14. Image sensor 14 may include one or more arrays of photosensitive elements such as image pixel array(s) 15. Photosensitive elements (image pixels) such as photodiodes on arrays 15 may convert the light into electric charge. Image sensor 14 may also include control circuitry 17. Control circuitry 17 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, and other circuitry for operating the image pixels of image pixel array(s) 15 and converting electric charges into digital image data. Control circuitry 17 may include, for example, pixel row control circuitry coupled to arrays 15 via row control lines and column control and readout circuitry coupled to arrays 15 via column readout and control lines.

Still and video image data from imaging system 10 may be provided to storage and processing circuitry 16. Storage and processing circuitry 16 may include volatile and/or nonvolatile memory (e.g., random-access memory, flash memory, etc.). Storage and processing circuitry 16 may include microprocessors, microcontrollers, digital signal processors, application specific integrated circuits, etc.

Image processing circuitry 16 may be used to store image data and perform image processing functions such as data formatting, adjusting white balance and exposure, implementing video image stabilization, face detection, image data write control, image data read control, output image pixel address to input image pixel address transformation, etc. Storage and processing circuitry 16 may include one or more conformal image buffers, a pixel transformation engine, a write control engine, a read control engine, an interpolation engine, a transformation engine, etc.

In one suitable arrangement, which is sometimes referred to as a system-on-chip (SOC) arrangement, image sensor(s)

14 and image processing circuitry 16 are implemented on a common semiconductor substrate (e.g., a common silicon image sensor integrated circuit die). If desired, image sensor(s) 14 and image processing circuitry 16 may be formed on separate semiconductor substrates. For example, sensor 14 and processing circuitry 16 may be formed on separate substrates that are stacked.

Imaging system 10 (e.g., processing circuitry 16) may convey acquired image data to host subsystem 20 over path 18. Host subsystem 20 may include a display for displaying image data captured by imaging system 10. Host subsystem 20 may include processing software for detecting objects in images, detecting motion of objects between image frames, determining distances to objects in images, filtering or otherwise processing images provided by imaging system 10. Host subsystem 20 may include a warning system configured to generate a warning (e.g., a warning light on an automobile dashboard, an audible warning or other warning) in the event objects in captured images are determined to be less than a predetermined distance from a vehicle in scenarios where system 900 is an automotive imaging system.

If desired, system 900 may provide a user with numerous high-level functions. In a computer or advanced cellular telephone, for example, a user may be provided with the ability to run user applications. To implement these functions, host subsystem 20 of system 900 may have input-output devices 22 and storage and processing circuitry 24. Input-output devices 22 may include keypads, input-output ports, joysticks, buttons, displays, etc. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

The image pixels of image pixels array(s) 15 may each include a photosensitive element such as photodiode, a positive power supply voltage terminal, a ground voltage terminal and additional circuitry such as reset transistors, source follower transistors, row-select transistors, charge storage nodes, etc. Image pixels in image pixel array(s) 15 may be three-transistor pixels, pin-photodiode pixels with four transistors each, global shutter pixels, time-of-flight pixels, or may have any other suitable photo-conversion architectures.

Figure 2:
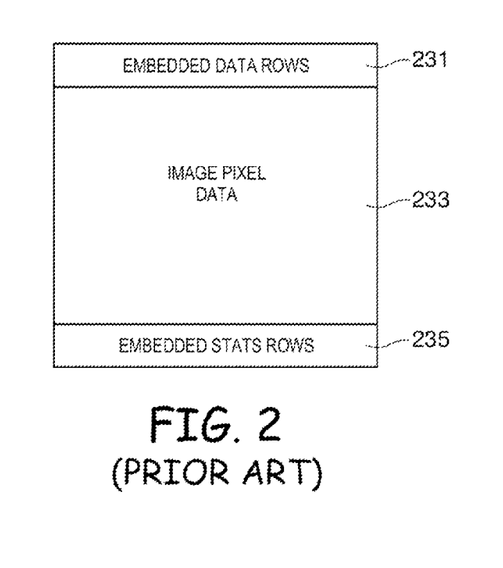
FIG. 2 is a diagram showing a prior-art output frame containing embedded data that is generated in conventional imaging systems.

FIG. 2 illustrates a prior-art output frame used in conventional image sensors. An image frame contains rows of image pixel data 233 which correspond to digital pixel values read out from image pixels such as those in pixel arrays 15 of FIG. 1. In conventional imaging systems, embedded rows 231 and 235 are appended to the top and bottom of image pixel data 233. Embedded data rows 231 and 235 appended to the top and bottom of image pixel data 233 limit the amount of rows of image pixel data that is included when the bandwidth allowed by an imaging system is fixed or constrained. Rows of embedded data 231 and 235 do not contain pixel data read out from pixel arrays, but rather consume a portion of output bandwidth that could be alternatively be used to transmit and store pixel data.

In a multi-frame image capture mode of system 900, multiple successive output frames may be produced. Embedded data rows 231 may contain data corresponding to settings or image data statistics based on image data read out in a previous frame, a plurality of previous frames such as an cumulative average intensity value for a given color channel. Data from embedded rows 231 may be used to adjust color gain registers that influence the image pixel signals that are produced and read out from image pixel arrays 15.

Image pixel data 233, as described above, may correspond to digital pixel values read out from an image sensor. Bandwidth for an imaging system 900 may be limited. As an example, if imaging system 900 is configured to capture 100 frames per second, each frame may be limited to 100 rows of data. In the example of FIG. 2, embedded rows 231 and 235 may occupy 10 rows each, reducing the amount of imaging data that can be stored in an output frame to 80 rows. In output frames of conventional imaging systems, embedded rows 231 and 235 that are appended to image pixel data 233 occupy data rows and limit the amount of rows of image pixel data 233 that can be stored in an output frame of a limited size. Limiting the size of embedded rows 231 and 235 may negatively affect the performance of the system 900, as there will be less data that can be used to verify or calibrate the image sensor 14, for example.

Figure 3:
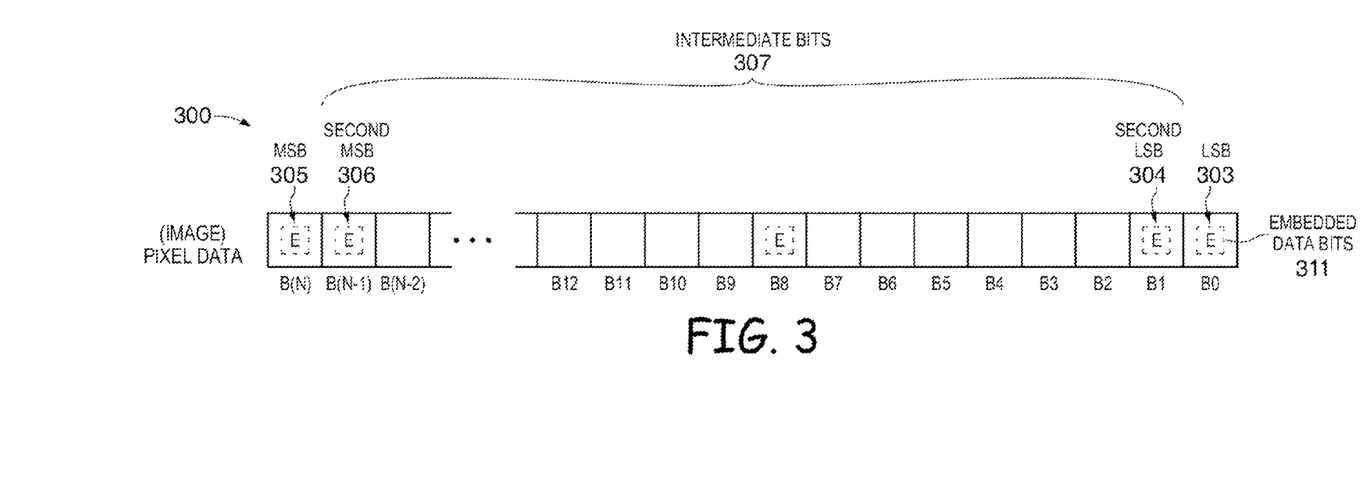
FIG. 3 is a diagram showing illustrative pixel data that has been modified to include bits of embedded data in accordance with an embodiment.

FIG. 3 illustrates a pixel data word that is modified to store bits of embedded data. Pixel data word 300 may be a data word used to represent the value of a given pixel in an output frame. Pixel data may be output in rows and columns; pixel data may correspond to image pixel data, or non-imaging pixel data, such as dark row pixels, row noise correction pixels, or test column pixels that may be included in an output frame of an imaging system 900.

Embedded data 311 to be output in a given output frame may comprise multiple embedded data bits 311. Embedded data 311 may correspond to values stored in registers that control the operating settings of image pixel arrays 15. Embedded data 311 may correspond to values stored in registers, such as registers in control circuitry 17 that are used to configure image capture, signal readout, or image processing settings in the imaging system. Embedded data 311 may also be used by processing circuitry such as storage and processing circuitry 16 to perform Automotive Safety Integrity Level (ASIL) checks, by verifying that data written to registers in, for example, control circuitry 17 of FIG. 1, processing circuitry 16 or host subsystems 20 was correctly addressed and recorded in control circuitry 17.

Image pixel data 300 may be modified based on data stored in embedded data 311 by image processing circuitry such as image processing circuitry in storage and processing circuitry 16. The contents of one or more data words of image pixel data 300, corresponding to pixel data in a given output frame may influence the contents of embedded statistics included in embedded data 311. Embedded statistics included in embedded data 311 may contain frame identifiers, such as a frame count or ID. Embedded statistics included in embedded data 311 may also contain histogram values based on the image pixel data 233 that is read out, including an average color channel value, a low end histogram mean, and other statistical metrics for image pixel data.

Pixel data word 300 includes N bits: B0, B1, B2, [ . . . ], B(N). The least significant bit (LSB) 303 of pixel data word 300 may be modified to, in an embodiment of the present invention, correspond to a bit of embedded data 311 corresponding to any suitable non-image data. Alternatively or additionally, the most significant bit (MSB) 305 may be modified to correspond to a bit of embedded data. If desired, the second least significant bit (second LSB) 304 may alternatively or additionally be modified to correspond to a bit of embedded data. Similarly, the second most significant bit (second MSB) 306 may alternatively or additionally be modified to correspond to a bit of embedded data. Intermediate bits 307 may also be modified to correspond to bits of embedded data. FIG. 3 illustrates a bit B8 of pixel data word 300 that is modified to correspond to a bit of embedded data.

When modified in this way, rows of pixel data comprising multiple pixel data words 300 can be modified to accommodate embedded data by distributing bits of embedded data in the LSB 303, second LSB 304, intermediate bits 307, second MSB 306, and/or MSB 305. As an example, consider the case when an output frame of an image sensor is limited to 100 rows. Each row, in this example, may include 100 columns, and therefore correspond to 100 data words. A data word may correspond to 10 bits. If, in this example, there are 10 rows of embedded data and/or statistics that are output in a given output frame, the 10 rows correspond to 1,000 data words, or 10,000 bits. Therefore, in this example it is possible to distribute data corresponding to 10 rows of embedded data and/or statistics (10,000 bits) into a 100 row by 100 column array of pixel data words (10,000 words) by merely modifying a single bit in each of the pixel data words in the array of pixel data words to correspond to a bit of embedded data and/or statistics. By modifying two bits in each of the pixel data words in the array of pixel data words, one may distribute 20 rows of embedded data and/or statistics into the 100 row by 100 column array of pixel data words.

If, using the constraints of the above example, an output frame is limited to 100 rows of data, a conventional imager of FIG. 2 may only be able to store 90 rows of image pixel data 233 if 10 rows of embedded data/statistics rows 231 are stored in the output frame. In an embodiment of the present invention, an output frame may include 100 rows of image pixel data 233, by modifying a single bit in each of the data words of the image pixel data 233.

The choice of which bits are modified to correspond to embedded data may depend on the type of data stored in the pixel data words 300. As an example, when the value of a pixel data word 300 stores a low-intensity light value, modifying the LSB 303 of data word 300 may cause a large variation, or percent variation in the value represented by the pixel data word 300 and cause a noticeable image artifact when image pixel data is represented. However, if the values stored in a pixel data word 300 are known to be of a low magnitude, bits such as MSB 305, second MSB 306, or selected intermediate bits 307 which are assumed to be zero, or even constant may be modified to correspond to bits of embedded data. In such a scenario, when representing or displaying the pixel data word 300, it may be desirable to ignore the most significant bits 305 and 306 or selected intermediate bits 307 that were modified.

As the above example illustrates, one may be able to accommodate embedded data/statistics rows into an array of pixel data words, thereby eliminating the need for dedicated rows corresponding to embedded data/statistics rows such as those illustrated in FIG. 2. However, in an embodiment of the present invention, in addition to modifying selected bits of pixel data words to correspond to embedded data bits, one may also append dedicated rows of embedded data to the pixel data.

Figure 4:
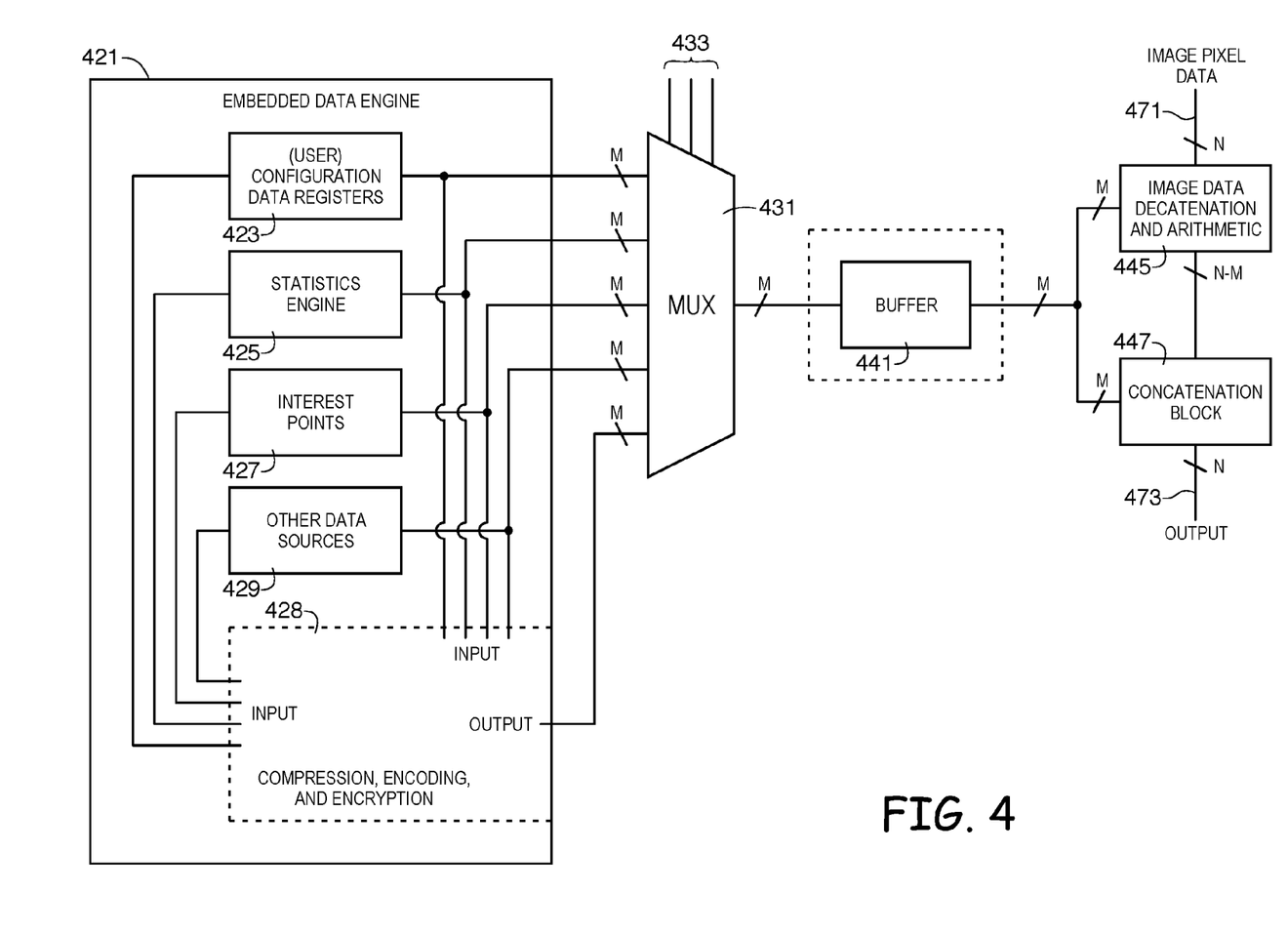
FIG. 4 is a diagram showing illustrative circuitry that can be used to modify pixel data to include bits of embedded data in accordance with an embodiment.

FIG. 4 illustrates circuitry that can be used to modify bits of pixel data words to correspond to bits of embedded data in embodiment of the present invention. FIG. 4 illustrates modifying bits of image pixel data 471 words, but as described above in connection with FIG. 3, any data words of any pixel type that is read out from an image sensor 14, including optically dark pixels, row noise correction pixels, and test column pixels may be modified using the circuitry of FIG. 4.

An embedded data engine 421 may be provided, which provides data that is not directly read out from pixels on an image sensor 14, but which may be desirable to include in an output frame. Embedded data engine includes configuration data registers 423, statistics engine 425, interest point engine 427, and other data sources 429. Embedded data engine 421 may also include compression, encoding, and encryption circuitry 428.

Configuration data registers 423 may store register values that are specified by a user of system 900, or that are determined by storage and processing circuitry 16 on the imaging system-on-chip 10. Register values in configuration data registers 423 may be used to change the operating settings of an image sensor 14 during imaging or test modes. As an example, configuration data registers 423 may specify color gains that determine the adjustment or scaling factor that is applied to certain image pixel signals that are read out from image pixel array 15. Configuration data registers 423 may also specify the amount of time between a reset of pixels in arrays 15 and a readout of the values of pixels in arrays 15, also known as integration time. In general, configuration data registers 423 may be used to specify any parameter that is used to determine an operating state of image sensors 14.

Statistics engine 425 may produce image statistics similar to those described in connection with embedded statistics rows 235 in FIG. 2. Statistics engine 425 may produce histogram data, a mean pixel value, histogram begin and end values, low end histogram means, a percentage of pixels below the low end mean, normal absolute deviation of pixels, and data corresponding to any other statistical estimator or combination of statistical estimators. Statistics engine 425 may generate statistical values corresponding to image pixel data, optically dark pixel data, row noise correction data, or test column data. Statistics engine 425 may generate statistics to be output with a given output frame, corresponding to statistics of image pixel data of the given output frame, image pixel data of a previous frame, or image pixel data of a plurality of previous frames. Statistics engine 425 may generate statistics corresponding to an entire frame of image pixel data or only a portion of a frame of image pixel data.

Interest point detection engine 427 may be used to output coordinates of identified points of interest in a frame of image pixel data. Point of interest coordinates output by interest point detection engine 427 may include coordinates of identified moving objects, identified human faces, identified text objects, identified glare artifacts, or any other point of interest. Points of interest coordinates for identified moving objects may be used by motion correction processing systems in storage and processing circuitry 16 or 24. Coordinates for identified human faces may be used by facial recognition processors in storage and processing circuitry 16 or 24. Coordinates of identified text objects may be used by Optical Character Recognition (OCR) processing circuitry in storage and processing circuitry 16 or 24. Coordinates of identified glare artifacts may be used by glare reduction processing circuitry in storage and processing circuitry 16 or 24.

Interest point detection engine 427 may additionally or alternatively be used to spatially indicate points of interest in a frame of image pixel data. As an example, data read out from image pixel array 15 may be read out using foveated imaging techniques, wherein a first set of selected regions of an image frame are read out at a first resolution, and a second set of other regions of an image frame are binned and read out at an effective second resolution that is less than the first resolution. Interest point detection engine 427 may be used to modify the bits of pixels corresponding to the first set of selected regions, or the second set of other regions of an image frame to indicate the regions are of a different resolution. In general, interest point detection engine 427 may be used to modify selected pixels based on their spatial position or based on the identified content of the pixels, such as an identified text, moving object, face, text, or glare artifact.

Other data sources 429 may provide watermarks, OCR data, temperature information, and audio to be output with an image frame.

Configuration data registers 423, statistics engine 425, interest point detection engine 427, and other data sources 429 may include serial transmission circuitry that outputs their respective data in M-bit packets.

Compression, encoding, and encryption engine 428 may optionally be included in an embedded data engine 421 and may receive and/or accumulate the M-bit packets output from configuration data registers 423, statistics engine 425, interest points engine 427, and other data sources 429. Compression, encoding, and encryption engine 428 or may receive the data from configuration data registers 423, statistics engine 425, interest points engine 427, and other data sources 429 directly. Compression, encoding, and encryption engine 428 may be used to compress, encode, and/or encrypt data from configuration data registers 423, statistics engine 425, interest points engine 427, and other data sources 429. Data may be compressed or encoded using run-length encoding, block-sorting compression algorithms, move-to-front transforms, byte pair encoding, or any other suitable lossless compression/encoding algorithm. Data input to compression, encoding, and encryption engine 428 may also be encoded or compressed using lossy compression algorithms. Data input to compression, encoding, and encryption engine 428 may be encrypted. Compression, encoding, and encryption engine 428 may receive keys used to encrypt data from other data sources 429.

Compression, encoding, and encryption engine 428 may also include serial transmission circuitry that outputs data in M-bit packets.

The outputs of components in embedded data engine 421 may be received by multiplexer 431 that is controlled by storage and processing circuitry 16/24 (FIG. 1) using select lines 433 (e.g. storage and processing circuitry 16/24 outputs control signals on select lines 433 to control the multiplexer 431). Storage and processing circuitry 16 or control circuitry 17 may be used to control which of the outputs of the multiple inputs of multiplexer 431 is output at a given time. M bits of a given pixel data word may be modified by the output of multiplexer 431. A buffer 441 may optionally be interposed between the multiplexer 431 and decatenation and arithmetic circuitry 445 and concatenation circuitry 447. It may be desirable to modify bits of selected pixel data words 471 with selected M-bit packets. As described above in connection with interest point engine 427, the spatial position of embedded data in the frame of pixel data may be used to mark or indicate a property of the spatial region surrounding a pixel with a modified data word.

Buffer 441 may be used to store data that is output before the pixel data word to be modified with the data which has been output on pixel data word line 471. Buffer 441 may be configured to output a given M-bit packet of data when a corresponding pixel data word to be modified by the given M-bit packet of data is output on pixel data word line 471.

Figure 5:
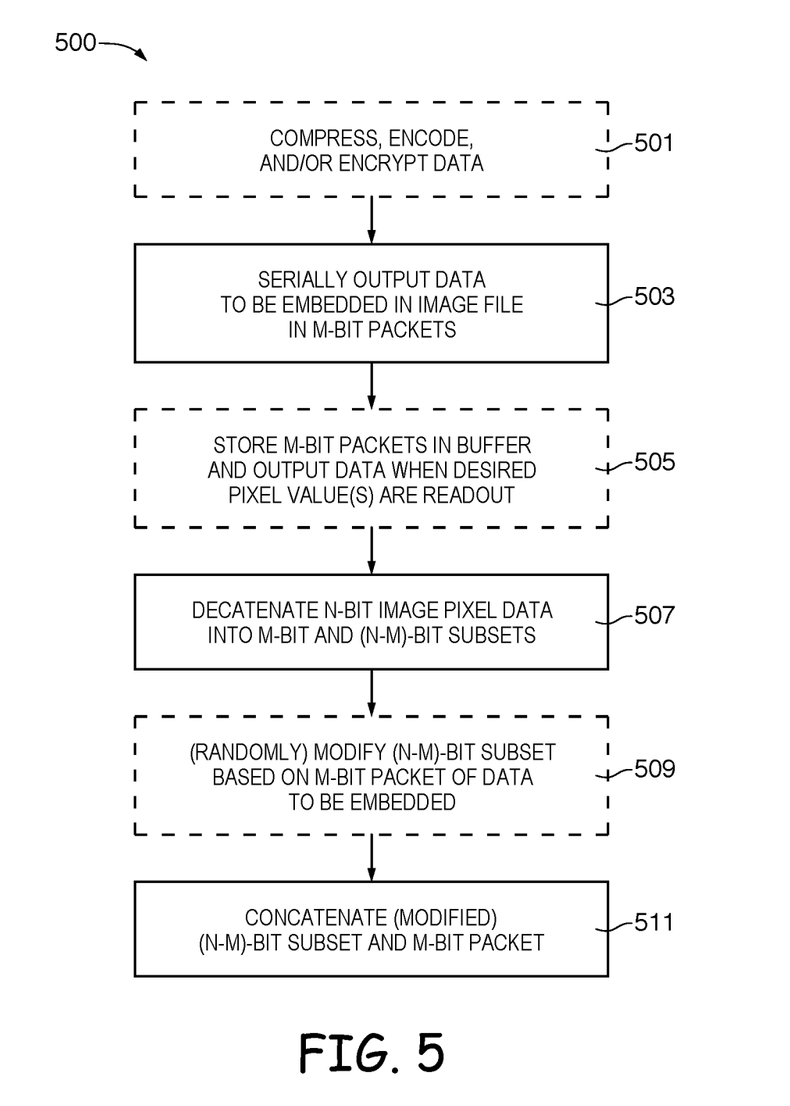
FIG. 5 is a flow chart of illustrative steps that can be used to modify pixel data to include bits of embedded data in accordance with an embodiment.
Figure 6:
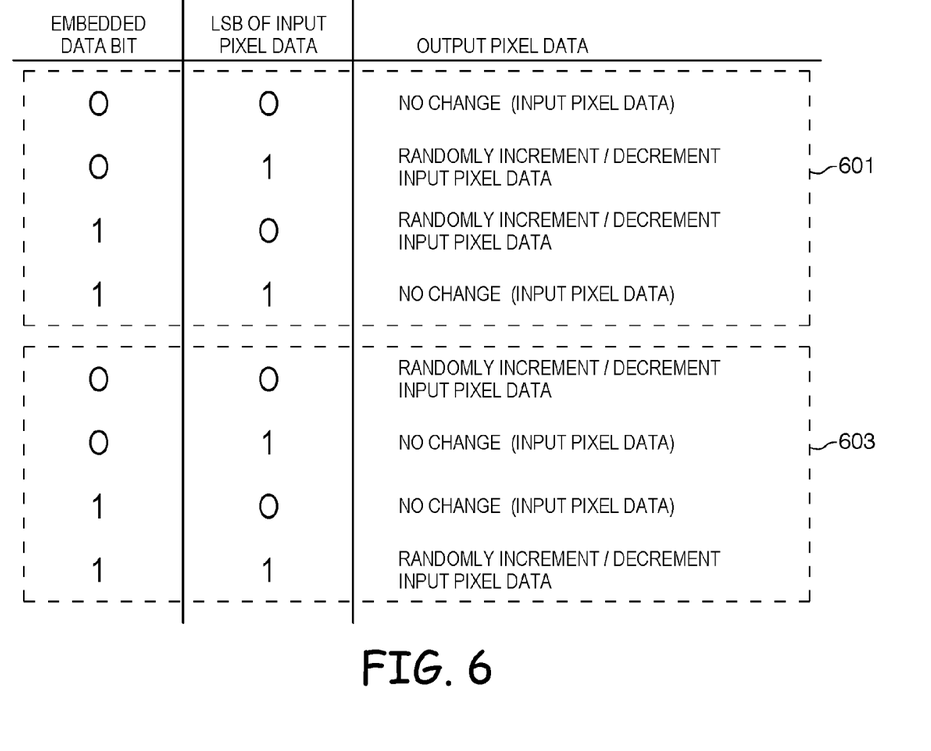
FIG. 6 is a table of an illustrative scheme that can be used to modify a least-significant bit of pixel data to store a bit of embedded data in accordance with an embodiment.

Decatenation and arithmetic circuitry 445 may receive an N-bit pixel data word on pixel data word line 471, and an M-bit packet of data to be embedded in the pixel data word. N may generally be greater than M. N and M used in the context of FIGS. 4-6 are not related to N and M used above in connection with the size of image sensors 14 of FIG. 1. Decatenation and arithmetic circuitry 445 may be used to decatenate, or split a data word into multiple portions based on the bits that will be modified to correspond to the M-bit packet output by multiplexer 431 or buffer 441.

Consider an example where M is equal to 5, meaning that five bits of a pixel data word are modified to correspond to embedded data bits. Using the illustrative data word 300 of FIG. 3, where bits B(N), B(N−1), B8, B1 and B0 are shown to be modified to correspond to bits of embedded data, decatenation and arithmetic circuitry may decatenate data word 300 into a first fragment comprising bits B(N) and B(N−1), a second fragment comprising bits B(N−2) through B9, a third fragment comprising bit B8, a fourth fragment comprising bits B7 through B2, and a fifth fragment comprising bits B1 and B0.

The bits of the first, third, and fifth fragments may be compared to corresponding bits of the M-bit packet received by decatenation and arithmetic circuitry 445 from embedded data engine 421. In this example, when M is equal to 5, bits of the first fragment may be compared to the two most significant bits of the M-bit packet, bits of the fifth fragment may be compared to the two least significant bits of the M-bit packet, and bit of the third fragment may be compared to the third bit of the M-bit packet. If the bits in the first, third, and fifth fragments are the same as their corresponding bits of the M-bit packet, all the fragments may be left unchanged, and the N−M bits that are not selected to be modified to correspond to embedded data bits (i.e., bits of the second and fourth fragments of the data word 300) may be output to concatenation circuitry 447 without any modification.

However, if the bits in the first, third, and fifth fragments are not the same as their corresponding bits of the M-bit packet, the second and/or fourth fragments may be modified by either incrementing or decrementing bits in the second and/or fourth fragments using decatenation and arithmetic circuitry 445. Decatenation and arithmetic circuitry 445 may increment or decrement bits in a data word, or fragments of a data word by one, two, three, or any integer value. Selecting which of the second and fourth fragments is to be incremented or decremented may depend on which of the first, third, and fifth fragments does not have the same bits as corresponding bits in the M-bit packet. For example, if the bits of the fifth fragment are not the same as their corresponding bits in the M-bit packet, then only the fourth fragment, which is adjacent to the fifth fragment, may be modified by either incrementing or decrementing the bits of the fourth fragment. In this way, the modification of those fragments which are not selected to be modified to include embedded data bits may correspond to a carry operation to reflect changes to adjacent fragments of bits which are selected to contain embedded data, when the bits of the adjacent fragments of bits selected to include embedded data are not equal to corresponding bits in the M-bit packet. For example, if the bits of the fifth fragment are not the same as corresponding bits in the M-bit packet, only the fourth fragment may be modified to reflect the change in the adjacent bits of the data word. In general, it may not be necessary to modify all or any of the fragments that are not selected to include embedded data, when bits in the fragments that are selected to include embedded data are not the same as corresponding bits in the M-bit packet.

When bits in fragments selected to include embedded data do not match corresponding bits of the M-bit packet received from embedded data engine 421, choosing whether to increment or decrement bits in the second and/or fourth fragments, and generally, bits that are not selected to be modified to correspond to embedded data bits, may be determined randomly. By randomly incrementing and/or decrementing bits that are not selected to be modified to correspond to embedded data bits, the noise introduced to the modified data words by modifying bits to correspond to embedded data bits is random, and is less likely to introduce visible artifacts in an image than if bits that are not selected to be modified to correspond to embedded data bits are always incremented or always decremented.

In an embodiment, some bits of a N-bit pixel data word that are not selected to be modified to correspond to embedded data bits may be left unmodified even if bits of the data word selected to be modified to correspond to embedded data bits do not match the bits of the M-bit packet received by decatenation and arithmetic circuitry 445. Bits of a N-bit pixel data word that are not selected to be modified to correspond to embedded data bits may be left unmodified in a truncation mode wherein bits selected to correspond to embedded data bits in a given pixel data word are simply replaced with the embedded data bits without modifying the remaining bits of the N-bit pixel data word.

In an embodiment, selected fragments of a given N-bit pixel data word that are not selected to be modified to correspond to embedded data bits (e.g., selected fragments of the second and fourth fragments, as described in the above example) may be incremented or decremented, while the remaining fragments that are not selected to be modified to correspond to embedded data bits may be left unchanged, even if the bits of the N-bit pixel data word that are selected to be modified to correspond to embedded data bits (e.g., bits of the first, third, and fifth fragments, as described in the above example) are not the same as the corresponding bits of embedded data in a given M-bit packet. Taking the example of the data word of FIG. 3 again, the second fragment of bits B(N−2) through B9 may be left unchanged even if the bits B(N) and B(N−1) of the first do not match corresponding bits in the M-bit packet. This embodiment may be used when an N-bit pixel data word corresponds to a pixel value associated with an image pixel that was operated in a low light setting, as an example. When the pixel value of the image pixel is known to be below a certain threshold due to an operating mode of the system 900 or the level of scene illumination, the most significant bits (i.e., bits B(N) and B(N−1)) may be known to have a zero value. In this example, the most significant bits of such a data word may be modified to correspond to bits of embedded data, without modifying the remaining bits B0 through B(N−2). When such a data word is processed, the most significant bits B(N) and B(N−1) may be interpreted only as embedded data bits, but not as part of the pixel value associated with the image pixel. In general, when data words corresponding to image pixel values are known to have a certain range of values in which given bits of the data words will have a constant or known value, those given bits of the data words may be modified to correspond to embedded data bits without modifying the remaining bits of the data word. During processing of data words in this way, the given bits of the data words may be interpreted only as embedded data bits, but not as part of the pixel value associated with the image pixel. When the pixel value of such data words is desired in a processing step, the given bits of such data words may be replaced with the constant or known value before the processing step occurs.

Certain pixel data words in an output image frame may be routed directly to the output data word line 473. Whether or not a given pixel data word is routed directly from input data word line 471 to output data word line 473 may be determined by the region of output image frame the image pixel is associated with. As an example, data words in the center of the image pixel data of an output frame may be read out directly (e.g., directly routed from input line 471 to output line 473), resulting in their bits being left unmodified. As another example, in imaging systems with foveated imaging capabilities, data words in the foveal region or regions of relatively high resolutions may be read out directly, resulting in their bits being left unmodified. Whether or not a given pixel data word is routed directly from input data word line 471 to output data word line 473 may be determined by the value represented by the pixel data word. As an example, when an imager is operating in low-light conditions pixel data words generally have smaller values relative to pixel data words output when the imager is operating in normal lighting conditions. Changing the least significant bit of a pixel data word read out from an image sensor that is used to capture images in a low-light environment may result in a noticeable visible artifact. A given pixel data word received on input data word line 471 may be compared to a threshold, and modified only if the value of the pixel data word is larger than the threshold.

Data decatenation and arithmetic circuitry 445 may output N−M bits corresponding to modified and/or unmodified fragments of the N-bit input pixel data word of pixel data word line 471 that include bits that were not selected to be modified to corresponding bits of the M-bit packet.

Concatenation circuitry 447 may receive the N−M bits output from data decatenation and arithmetic circuitry 445 and the M-bit packet of embedded data bits from multiplexer 431 or buffer 441. Concatenation circuitry 447 may be used to produce an N-bit output with embedded data bits at corresponding positions of an N-bit output word on output word line 473. Concatenation circuitry 447 may be configured to include bits of embedded data of the M-bit embedded data packet at the selected positions of an N-bit output word between modified and/or unmodified fragments of the N-bit input pixel data word of pixel data word line 471 that include bits of the pixel data word input from pixel data word line 471 that were not selected to be modified to corresponding bits of the M-bit packet.

FIG. 5 illustrates steps 500 that may be used to modify an N-bit pixel data word using the circuitry of FIG. 4. At step 501 compressing, encoding, and/or encrypting data, as described above in connection with compression, encoding, and encryption circuitry 428 of FIG. 4 is performed. In step 501, data output from configuration data registers 423, statistics engine 425, interest points engine 427, and other data sources 429 may be received and/or accumulated by compression, encoding, and encryption circuitry 428 of FIG. 4. Data from these sources may be compressed, encoded, and/or encrypted. Data may be compressed or encoded using run-length encoding, block-sorting compression algorithms, move-to-front transforms, byte pair encoding, or any other suitable lossless compression/encoding algorithm. Data from these sources may also be encoded or compressed using lossy compression algorithms. Data from these sources may also be encrypted using keys received from other data sources 429. Step 501 is optional.

At step 503 data may be serially output to be embedded in an image file or output frame, in M-bit packets. M-bit packets of compressed, encoded, and/or encrypted data to be embedded may be output from compression, encoding, and encryption engine 428. Data registers 423, statistics engine 425, interest points engine 427, and other data sources 429 may also be used to serially output M-bit packets of data to be embedded.

At step 505 M-bit packets may be stored in a buffer and outputting the M-bit packets when a desired pixel value is readout. As described above in connection with interest point engine 427, embedded data may be used to spatially indicate points of interest in a frame of image pixel data. Embedded data may be used to modify selected pixel data words of pixels based on the pixel's spatial position or based on the identified content of the pixels, such as an identified text, moving object, face, text, or glare artifact. A pixel data word may be modified based on the value of the pixel data word. If the pixel data word corresponds to a value below a threshold, the bits of the pixel data word may be left unmodified and simply routed directly from input pixel data word line 471 to output pixel data word line 473. Buffers, such as buffer 441 may be used to store data that is output before the pixel data word to be modified with the data has been output on pixel data word line 471. Buffer 441 may be configured to output a given M-bit packet of data when a corresponding pixel data word to be modified by the given M-bit packet of data is output on pixel data word line 471. Step 505 is optional.

At step 507 N-bit pixel data word may be decatenated into M-bit and (N–M) bit subsets. As described above in connection with decatenation and arithmetic circuitry 445, an N-bit pixel data word from pixel data word line 471 may be decatenated into a first subset of (N–M) bits that may include multiple fragments of an N-bit data word and a second subset of M-bits that may include multiple fragments of the N-bit data word. The second subset of M-bits corresponding to bits that are selected to be modified to correspond to embedded data bits.

If the bits of the second subset of M-bits corresponding to bits of the N-bit pixel data word that are selected to be modified to correspond to embedded data bits do not match the corresponding bits of the M-bit packet of data to be embedded that is output in steps 503 and 505, operation may proceed to step 509. At step 509, the first subset of (N–M) bits that may include multiple fragments of the N-bit data word may be modified. Fragments of the N-bit word in the first subset of (N–M) bits may be modified by either incrementing or decrementing bits in the fragments. Incrementing or decrementing bits in the fragments may involve incrementing or decrementing the bits by one, two, three, or any integer value. In general, it may not be necessary for all of the fragments in the first subset of (N–M) bits to be modified. Choosing whether to increment or decrement bits in the fragments, and generally, bits in the first subset of (N–M) bits, may be determined randomly. By randomly incrementing and/or decrementing bits that are not selected to be modified to correspond to embedded data bits, the noise introduced to the modified data words by modifying bits to correspond to embedded data bits is random, and is less likely to introduce visible artifacts in an image than if bits that are not selected to be modified to correspond to embedded data bits are always incremented or always decremented.

Step 509 may be skipped in certain embodiments of the present invention, or when the bits of the second subset of M-bits corresponding to bits of the N-bit pixel data word that are selected to be modified to correspond to embedded data bits match the corresponding bits of the M-bit packet of data to be embedded.

At step 511, the first (N–M) bit subset of the N-bit input pixel data word that may have been modified in step 509 or that may have been left unmodified, and the M-bit packet of data to be embedded may be concatenated. At step 511, an N-bit output word with embedded data bits at corresponding positions of an N-bit output word may be output on output word line 473. Bits of embedded data of the M-bit embedded data packet may be placed at selected positions of a N-bit output word between modified and/or unmodified fragments from the first (N–M) bit subset of the N-bit input pixel data word that correspond to bits of the input pixel data word that were not selected to be modified to correspond to bits of the M-bit packet of data to be embedded.

FIG. 6 describes two illustrative schemes that can be used to modify a least-significant bit such as LSB 303 of FIG. 3 of an input pixel data word, as an example of an embodiment of the present invention. FIG. 6 describes, in the terms of the embodiments of FIGS. 4 and 5, an example where M is equal to 1; in other words, a single bit of a given input pixel data word is modified to correspond to a bit of embedded data. The bit of a given input pixel data word that is selected to be modified to correspond to a bit of embedded data, in the example of FIG. 6 is the least-significant bit.

Scheme 601 describes changing the LSB of an input pixel data word if it does not match the embedded data bit. As is seen when the embedded data bit and the LSB of an input pixel data word are the same such as when both are 0 or 1, the output pixel data is the same as the input pixel data. In other words, there is no change in the input pixel data. When the embedded data bit and the LSB of the input data word are not the same, such as when the embedded data bit is 0 and the LSB of the input data word is 1 or when the embedded data bit is 1 and the LSB of the input data word is 0, the input pixel data is randomly incremented or decremented by 1, so that the LSB of the input pixel data word corresponds to the embedded data bit.

Scheme 603 describes changing the LSB of an input pixel data word if it matches the embedded data bit. As is seen when the embedded data bit and the LSB of an input pixel data word are the same such as when both are 0 or 1, the input pixel data is randomly incremented or decremented by 1, so that the LSB of the input pixel data word corresponds to the inverse of the embedded data bit. When the embedded data bit and the LSB of the input data word are not the same, such as when the embedded data bit is 0 and the LSB of the input data word is 1 or when the embedded data bit is 1 and the LSB of the input data word is 0, the output pixel data is the same as the input pixel data. In other words, there is no change in the input pixel data, and the LSB of the input pixel data word corresponds to the inverse of the embedded data bit.

Figure 7:
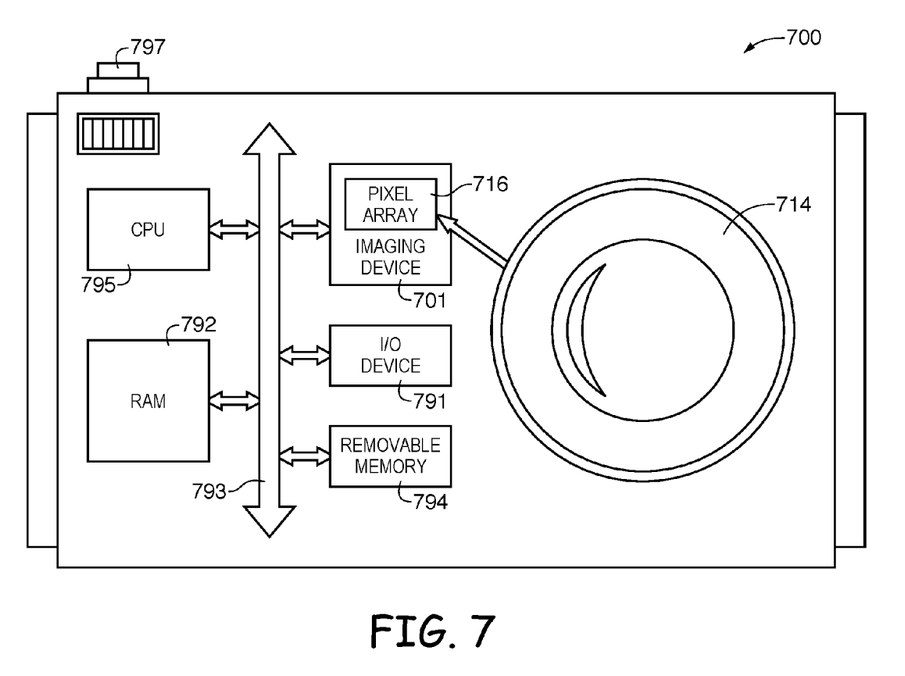
FIG. 7 is a block diagram of an imager employing one or more embodiments of FIGS. 1-6.

FIG. 7 shows in simplified form a typical processor system 700, such as a digital camera, which includes an imaging device such as imaging device 701 which may be, for example a multi-camera imaging system with one or more pixel arrays 716. Device 701 may include the elements of system 900 (FIG. 1) or any relevant subset of the elements. Processor system 700 is exemplary of a system having digital circuits that could include imaging device 701. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 700, which may be a digital still or video camera system, may include a lens or multiple lenses indicated by lens 714 for focusing an image onto a pixel array or multiple pixel arrays such as pixel array 716 when shutter release button 797 is pressed. Processor system 700 may include a central processing unit such as central processing unit (CPU) 795. CPU 795 may be a microprocessor that controls camera functions and one or more image flow functions and communicates with one or more input/output (I/O) devices 791 over a bus such as bus 793. Imaging device 701 may also communicate with CPU 795 over bus 793. System 700 may include random access memory (RAM) 792 and removable memory 794. Removable memory 794 may include flash memory that communicates with CPU 795 over bus 793. Imaging device 701 may be combined with CPU 795, with or without memory storage, on a single integrated circuit or on a different chip. Although bus 793 is illustrated as a single bus, it may be one or more buses or bridges or other communication paths used to interconnect the system components.

Various embodiments have been described illustrating systems with embedded data transmission capabilities. An output frame corresponding to a frame of pixel data may be produced. Pixel data in an output frame may include data from imaging pixels corresponding to visible light incident on an image sensor. Pixel data in an output frame may also include, or be based on data from non-imaging pixels such as optically dark columns, row noise correction columns, test columns, or any other suitable non-imaging pixels on an image sensor array. Embedded data may be included in a given output frame. Embedded data included in a given output frame may correspond to data that describes or is related to pixel data of the given output frame. Embedded data included in a given output frame may correspond to data that describes or is related to pixel data of a previous output frame, or multiple previous output frames.

Pixel data of an output frame may include multiple data words. A data word may include multiple bits. Pixel data may be read out from pixels on an image sensor. A given pixel data word in the output frame may be split or decatenated into multiple fragments, each containing bits of the pixel data word. As an example, a given data word may be decatenated into a first fragment that will be replaced with bits corresponding to bits of embedded data. The first fragment may correspond to a least significant bit of the given data word, bits adjacent to the least significant bit of the given data word, a most significant bit of the data word, bits adjacent to the most significant bit of the data word, or intermediate bits of the data word that are not adjacent to either the least or most significant bits of the pixel data word.

A first subset of the fragments of the data word produced by decatenation of the data word may be discarded and replaced with embedded data bits. A second subset of the fragments of the data word may be modified based on whether the bits of the first subset were the same as the embedded data bits they were replaced with. The second subset may be modified if the bits of the first subset are the same as the bits they are replaced with. The second subset may alternatively not be modified if the bits of the first subset are the same as the bits they are replaced with. In certain embodiments, the second subset may not be modified at all. Modification of the second subset of fragments of the data word may be performed using arithmetic circuitry that increments, decrements or performs other arithmetic operations on either the second subset of fragments of the data word. Modifying of the second subset of fragments of the data may include performing arithmetic operations on the data word before it is decatenated, and then decatenating it into the second subset of fragments.

Embedded data may include data that has been compressed, encoded, or encrypted. Encrypted embedded data may be encrypted using a key provided by a data source in an embedded data engine. The embedded data engine may also include a statistics engine, an interest point engine, user configuration data registers, and other data sources that provide watermarks, OCR data, temperature information, and audio data. Compression, encoding, and encryption circuitry may be coupled to the data sources in the embedded data engine and serial transmission circuitry. The data sources in the embedded data engine may be coupled to serial transmission circuitry.

A multiplexer may receive serial transmissions from the embedded data engine, corresponding to data to be embedded in pixel data words. A buffer may receive output packets from the multiplexer and provide the output packets to decatenation, arithmetic, and concatenation circuitry. Arithmetic and/or concatenation circuitry may receive pixel data words from an input data word line. Any given pixel data word that is received from the image sensor on the input data word line may be associated with a respective coordinate value. The buffer may provide outputs to the decatenation, arithmetic, and concatenation circuitry when a pixel data word with a desired or particular coordinate value is produced on in input data word line coupled to the decatenation and/or arithmetic circuitry. In this way, the position of the data word in which a bit of embedded data is included is deliberate. Similarly, pixel data words corresponding to low light values (e.g., data words corresponding to a value below a certain threshold) may be left unmodified, to avoid image artifacts that could result if (as an example) the least significant bits of such pixel data words were modified. Deliberately modifying data words in certain regions of the output frame may be useful in modifying only those areas which are not occupied by an interest point. In foveated image systems, low resolutions regions of an image frame may be modified to include bits of embedded data.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for modifying bits of an input pixel data word, comprising:
    outputting an embedded data packet using an embedded data engine;
    receiving the input pixel data word and the embedded data packet at decatenation circuitry;
    separating the input pixel data word into a first fragment of the data word and a second fragment of the data word at the decatenation circuitry, wherein the second fragment of the data word and the embedded data packet have an equal number of bits;
    modifying the bits of the first fragment of the data word to produce a modified version of the first fragment of the data word using arithmetic circuitry; and
    producing an output data word comprising the embedded data packet and the modified version of the first fragment of the data word using concatenation circuitry.

2. The method defined in claim 1, wherein modifying the bits of the first fragment of the data word comprises:

incrementing the bits of the first fragment of the data word when the bits of the embedded data packet are not the same as the bits in the second fragment of the data word.

3. The method defined in claim 1, wherein modifying the bits of the first fragment of the data word comprises:
incrementing the bits of the first fragment of the data word when the bits of the embedded data packet are the same as the bits in the second fragment of the data word.

4. The method defined in claim 1, wherein outputting the embedded data packet comprises:
using compression circuitry coupled to a data source, compressing data received from the data source and outputting the compressed data.

5. The method defined in claim 1, wherein outputting the embedded data packet comprises:
using encryption circuitry coupled to first and second data sources, encrypting data produced from the first data source based on a key provided by the second data source.

6. The method defined in claim 1, wherein the input data pixel is associated with a given coordinate on an output image frame, and wherein the embedded data packet is associated with a desired coordinate value, the method further comprising:
storing the embedded data packet at buffer circuitry and outputting the embedded data packet when the coordinate of the input data pixel is the same as the desired coordinate value.

7. Image processing circuitry for modifying bits of an input pixel data word, comprising:
an embedded data engine configured to output at least one bit of embedded data;
decatenation circuitry that is coupled to the embedded data engine and that is configured to separate the input pixel data word into first and second subsets of bits;
arithmetic circuitry that modifies bits of the first subset of bits based on whether the at least one bit of embedded data is the same as at least one corresponding bit of the second subset of bits; and
concatenation circuitry that is coupled to the decatenation circuitry and that is configured to produce an output data word including the at least one bit of embedded data.

8. The image processing circuitry defined in claim 7, wherein the embedded data engine comprises:
serial output circuitry;
configuration data registers that are configured to provide register values to the serial output circuitry;
a statistics engine that is configured to provide image statistics data to the serial output circuitry; and
an interest points engine that is configured to provide coordinate values of interest points to the serial output circuitry.

9. The image processing circuitry defined in claim 7, further comprising:
multiplexing circuitry coupled between the embedded data engine and the decatenation circuitry; and
buffer circuitry coupled between the multiplexing circuitry and the decatenation circuitry.

10. The image processing circuitry defined in claim 7, wherein the output data word further includes the modified bits of the first subset.

11. The image processing circuitry defined in claim 10, wherein the input data word includes N bits, wherein the second subset of bits includes a least significant bit of the input pixel data word, and wherein the modified bits of the first subset comprise (N−1) most significant bits of the input data word incremented by 1.

12. The image processing circuitry defined in claim 7, wherein the at least one bit of embedded data corresponds to at least one bit of audio data.

13. The image processing circuitry defined in claim 7, wherein the at least one bit of embedded data corresponds to a bit of data selected from the group consisting of: coordinate data, compressed data, and encrypted data.

14. The image processing circuitry defined in claim 7, wherein the output data word further comprises the first subset of bits.

15. A system, comprising:
a central processing unit;
memory;
input-output circuitry; and
an image sensor, comprising:
an embedded data engine that produces a plurality of bits of embedded data;
image processing circuitry that reads out at least one data word from the image sensor;
arithmetic circuitry that modifies a first subset of the at least one data word in response to determining whether a selected second subset of the data word is identical to a respective subset of the plurality of bits of embedded data; and
output circuitry that produces an output data word based on the at least one data word, wherein the output data word comprises the subset of the plurality of bits of embedded data.

16. The system defined in claim 15, wherein the subset of the plurality of bits of embedded data comprises the most significant bits of the output data word.

17. The system defined in claim 15, wherein the subset of the plurality of bits of embedded data comprises the least significant bits of the output data word.

18. The system defined in claim 15, wherein the subset of the plurality of bits of embedded data comprises intermediate bits of the output data word.

* * * * *